US008757350B2

(12) United States Patent
Ye et al.

(10) Patent No.: US 8,757,350 B2
(45) Date of Patent: Jun. 24, 2014

(54) ADJUSTABLE BRACKET FOR STEP FLANGE COVER

(75) Inventors: Ke Ye, Guangzhou (CN); Yanying Chen, Guangzhou (CN); Jian Liang, Guangzhou (CN)

(73) Assignee: Otis Elevator Company, Farmington, CT (US)

( * ) Notice: Subject to any disclaimer, the term of this patent is extended or adjusted under 35 U.S.C. 154(b) by 247 days.

(21) Appl. No.: 13/258,059

(22) PCT Filed: Apr. 3, 2009

(86) PCT No.: PCT/IB2009/005163
§ 371 (c)(1),
(2), (4) Date: Sep. 21, 2011

(87) PCT Pub. No.: WO2010/112952
PCT Pub. Date: Oct. 7, 2010

(65) Prior Publication Data

US 2012/0006647 A1 Jan. 12, 2012

(51) Int. Cl.
*B65G 15/00* (2006.01)

(52) U.S. Cl.
USPC ............................ 198/321; 198/326; 198/335

(58) Field of Classification Search
USPC .......................................... 198/321, 326, 335
See application file for complete search history.

(56) References Cited

U.S. PATENT DOCUMENTS

| | | | | |
|---|---|---|---|---|
| 3,862,681 | A * | 1/1975 | Barker | 198/563 |
| 4,519,490 | A | 5/1985 | White | |
| 4,646,907 | A | 3/1987 | Streibig et al. | |
| 4,669,597 | A | 6/1987 | Langer et al. | |
| 4,842,122 | A | 6/1989 | Van Nort | |
| 4,953,686 | A | 9/1990 | Rulke | |
| 5,156,251 | A | 10/1992 | Johnson | |
| 5,180,047 | A | 1/1993 | Barrett et al. | |
| 5,186,302 | A | 2/1993 | Johnson et al. | |
| 5,542,522 | A * | 8/1996 | Adrian et al. | 198/337 |
| 5,560,468 | A | 10/1996 | Inoue | |
| 5,601,179 | A | 2/1997 | Wente et al. | |
| 6,082,520 | A | 7/2000 | Kleewein et al. | |

FOREIGN PATENT DOCUMENTS

| | | | |
|---|---|---|---|
| CN | 101148236 | A | 3/2008 |
| CN | 101151204 | A | 3/2008 |
| CN | 101224840 | A | 7/2008 |
| CN | 101293614 | A | 10/2008 |
| DE | 10125686 | | 1/2003 |

(Continued)

OTHER PUBLICATIONS

The Jan. 4, 2010 International Search Report for International Application No. PCT/IB2009/005163.

(Continued)

*Primary Examiner* — Ramya Burgess
*Assistant Examiner* — Lester Rushin
(74) *Attorney, Agent, or Firm* — Cantor Colburn LLP

(57) ABSTRACT

A connection between step flange covers 54 and passenger conveyor frames 60 is adjustable to vary the position of a step flange cover relative 54 to moving tread plates 18 or a moving skirt 52 in at least two directions. The adjustable connection 64 permits the step flange cover 54 to be precisely positioned with respect to the tread plates 18 or the skirt 52 without the necessity of using crude adjustment techniques, such as, for example, using shims.

28 Claims, 7 Drawing Sheets

(56) References Cited

FOREIGN PATENT DOCUMENTS

| | | | |
|---|---|---|---|
| JP | 2004514629 | A | 5/2004 |
| JP | 2005162346 | A | 6/2005 |
| JP | 2006168939 | A | 6/2006 |
| KR | 930004746 | | 7/1993 |

OTHER PUBLICATIONS

English Translation of Chinese Search Report, dated Mar. 14, 2013.
English Translation of Chinese Office Action, issued Apr. 2, 2013.

* cited by examiner

ADJUSTABLE BRACKET FOR STEP FLANGE COVER

BACKGROUND

The present invention relates to a passenger conveyor system, and more particularly to adjustable brackets for step flange covers in escalators and moving walks.

A typical passenger conveyor, such as an escalator or moving walk, includes a series of tread plates, a frame, a drive, a step chain and a pair of balustrade assemblies. The frame comprises a truss section on both the left and right hand sides of the frame. Each truss section has two end sections forming landings, connected by an inclined midsection. Matching pairs of roller tracks are attached on the inside of each truss section, i.e. the side of the truss section facing the other truss section. The upper landing usually houses the escalator drive between the trusses. The drive powers a pair of step chain sprockets, which in turn impart motion to the step chain to move the tread plates. The step chain and tread plates travel a closed loop, running from one elevation to the other elevation, and back.

The individual steps of an escalator typically move in a very narrow "channel" defined by panel elements that are commonly referred to as the skirt boards or panels. These skirt boards are attached to the frame of the escalator, and therefore remain fixed as the steps move therebetween. In order to reduce the risk that objects are pulled into and trapped in the gap on each side between the steps and the skirt board, this gap is kept very small. However, minimizing the gap between steps and skirt boards significantly increases installation and maintenance costs and complexity. One alternative escalator configuration includes a "guarded step" wherein a panel having flanges is attached to the step at each side, thereby eliminating the gap. Another alternative escalator configuration with a very small gap between steps and skirt boards includes a "moving skirt" or skirt boards that move in the same direction and speed as the steps. Moving skirts substantially reduce the risk of trapping objects in the gap between the step and skirt boards, because there is no relative motion between the two components.

One design challenge in passenger conveyors that employ a moving skirt is positioning a cover that is connected to the frame and forms the junction between the moving skirt and the stationary conveyor structure. The step flange cover, as it is sometimes called, needs to be positioned precisely with respect to the moving skirt to minimize the gap between the moving skirt, i.e. the step flanges, and the cover.

SUMMARY

Embodiments of the present invention include a passenger conveyor. The conveyor includes a frame. A step chain is moveably connected to the frame. A conveyor drive is connected to the frame and configured to drive the step chain. Tread plates are connected to the step chain. A step flange cover is arranged adjacent to the tread plates. A first bracket is connected to the frame. A second bracket is connected to the step flange cover. Bosses are arranged on one of the first bracket and the second bracket. A connector between the first bracket and the second bracket is configured to pivot the second bracket with respect to the first bracket about the bosses to vary a position of the step flange cover in at least two directions.

Embodiments of the present invention also include a device for connecting a step flange cover to a frame of a passenger conveyor. A first bracket is connected to the frame. A second bracket is connected to the step flange cover. Bosses are arranged on one of the first bracket and the second bracket. A connector between the first bracket and the second bracket is configured to pivot the second bracket with respect to the first bracket about the bosses to vary a position of the step flange cover in at least two directions.

Embodiments of the present invention also include a method of adjustably connecting a step flange cover to a frame of a passenger conveyor. A first bracket is attached to the frame. A second bracket is attached to the step flange cover. The first bracket is connected to the second bracket such that the second bracket is pivotable with respect to the first bracket about one or more bosses on one of the first bracket and the second bracket.

DETAILED DESCRIPTION

Figure 1:
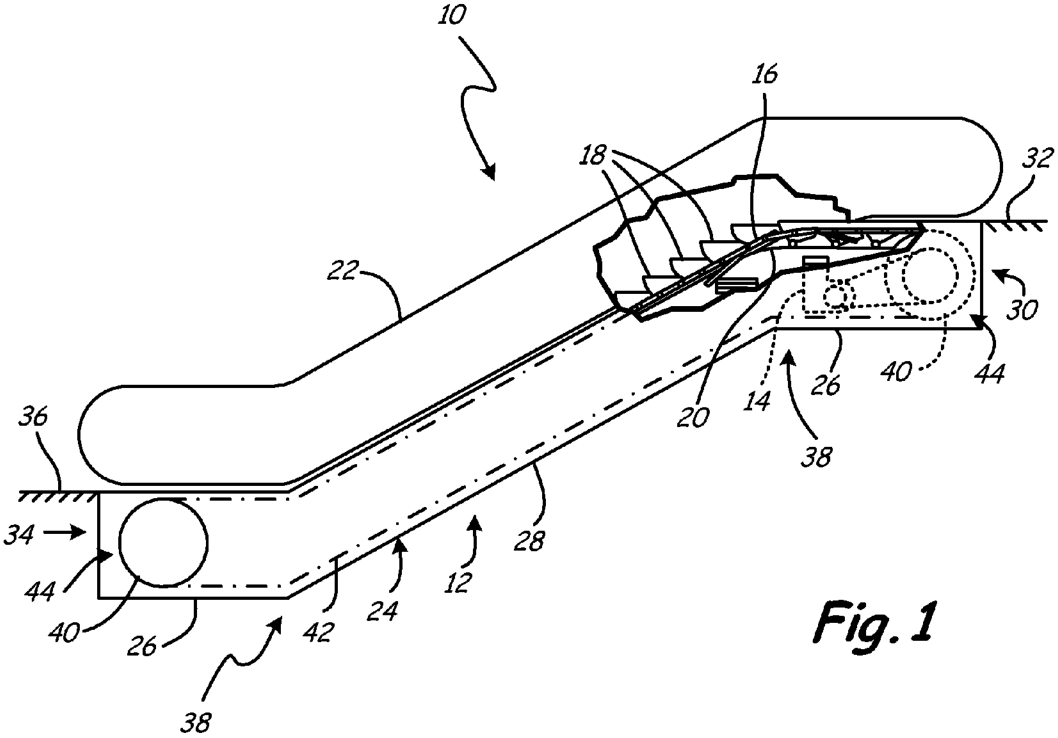
FIG. 1 is a schematic elevation view of an escalator.

FIG. 1 is schematic elevation view of escalator 10 including frame 12, drive 14, step chain 16, steps 18, roller tracks 20, and balustrade assemblies 22. Frame 12 includes truss section 24 on both the left and right hand sides of frame 12 (only one side is shown in FIG. 1). Each truss section 24 has two end sections 26 parallel to one another, connected by an inclined midsection 28. The end sections 26 form upper landing 30 at upper elevation 32 and lower landing 34 at lower elevation 36. Matching pairs of roller tracks 20 are attached on the inside of each truss section 24, i.e. the side of truss section 24 facing the other truss section 24. The region between inclined midsection 28 and landings 30, 34 in which the slope of roller track 20 is changing from the slope of incline 28 to the slope of landings 30, 34, is defined to be transition region 38 between inclined midsection 28 and either of landings 30, 34.

Upper landing 30 houses escalator drive 14, between truss sections 24. Drive 14 powers a pair of step chain sprockets 40, which in turn impart linear motion to step chains 16. Steps or tread plates 18 are connected to step chains 16 and guided along roller tracks 20 as they are driven along with step chains 16 by escalator drive 14. Step chains 16 and steps 18 travel through closed loop path 42 (shown in phantom in FIG. 1), running from one elevation to the other elevation (32, 36), and back. The regions of the closed loop path through which step chains 16 and steps 18 travel includes two turnarounds 44 as chains 16 and steps 18 travel around sprockets 40 at upper and lower landings 30, 34.

Figure 2:
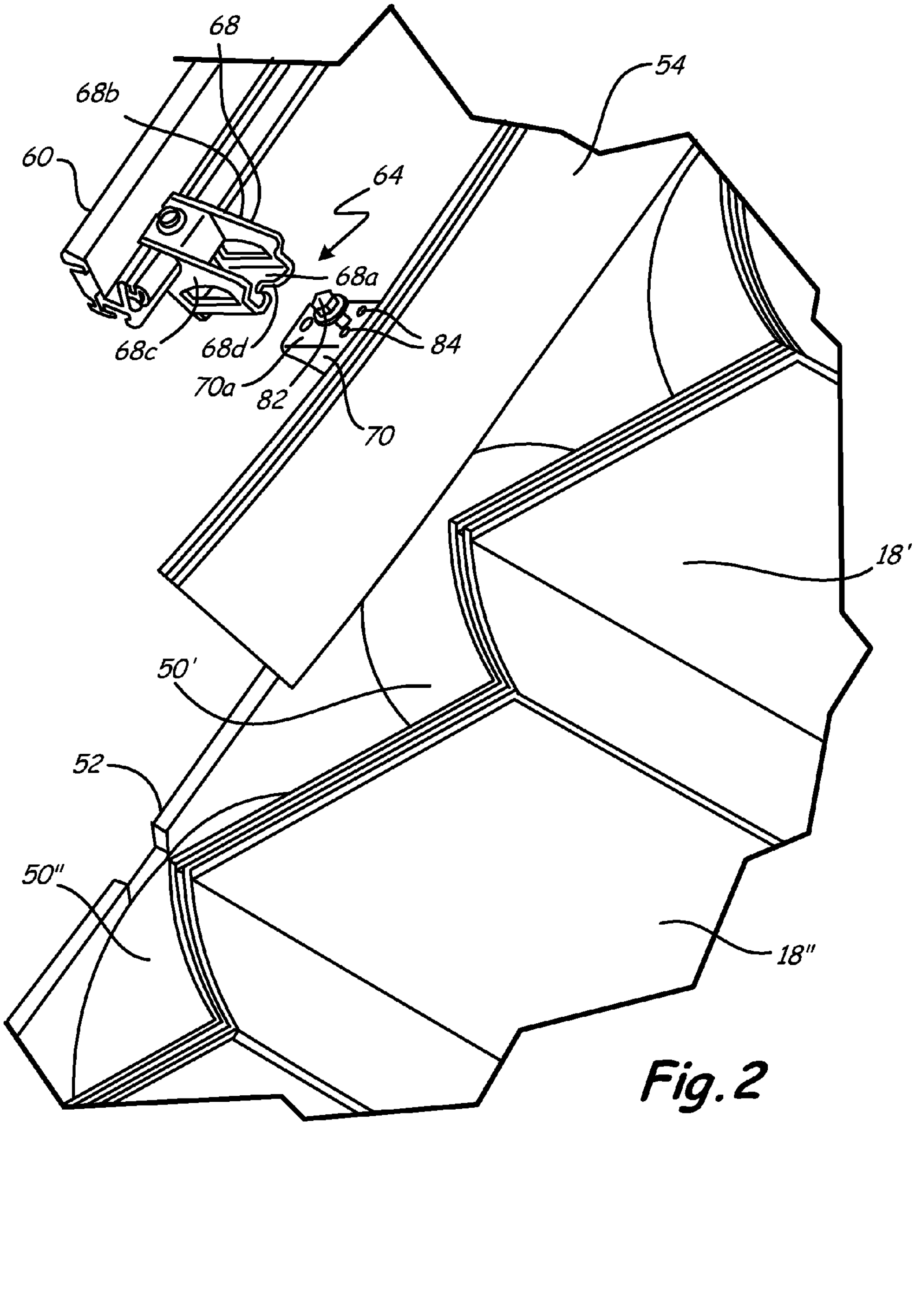
FIG. 2 is a partial perspective view showing an adjustable connection according to the present invention between the frame and step flange cover of the escalator of FIG. 1.

FIG. 2 is a partial perspective view showing adjustable connection 64 according to the present invention between step flange cover 54 and frame member 60 of frame 12. Adjustable connection 64 is shown in proximity to adjacent steps 18 assembled for operation in escalator 10 and in an exploded condition to better distinguish between the different components comprising connection 64. Frame member 60 is just one specific element of the overall stationary frame 12 in which the elements of escalator 10 are arranged and to which they are connected. Frame member 60 is connected to the overall stationary structure of frame 12 (not shown for simplicity) and runs generally parallel to the exposed portion of closed loop path 42 (i.e. the portion where the moving skirt is exposed to passengers) through which steps 18 travel during operation of escalator 10. In FIG. 2, first step 18' includes first step flange 50' and is arranged adjacent second step 18", which includes second step flange 50". Bridge member 52 is arranged between first step flange 50' and second step flange 50" to form a moving skirt of escalator 10. Steps 18', 18" are shown in inclined portion 28 of closed loop path 42 through which they travel during operation of escalator 10.

Arranged adjacent and partially covering second step flange 50" of step 18" is step flange cover 54. Step flange cover 54 needs to be positioned precisely with respect to first and second step flanges 50', 50" and bridge member 52, i.e. the moving skirt, to minimize the gap between the moving skirt and the cover. Although reference is made to conveyors with moving skirts, embodiments of the present invention may also be employed in passenger conveyors with stationary, rather than moving skirts. In such embodiments, the step flange cover may be arranged adjacent to moving tread plates that do not include skirt plates or bridges interposed between adjacent skirt plates. The skirt plate is arranged in close proximity but out of contact with the side of the tread plates to form at least part of the stationary skirt of the conveyor. Embodiments of the present invention accordingly provide a connection between step flange covers and passenger conveyor frames that is adjustable to vary the position of a step flange cover relative to moving tread plates or a moving skirt in at least two directions. The adjustable connection permits the step flange cover to be precisely positioned with respect to the tread plates or the skirt without the necessity of using crude adjustment techniques, such as, for example, using shims. Referring again to FIG. 2, step flange cover 54 remains stationary relative to the moving step flanges, e.g. first and second step flanges 50', 50", and is connected to frame member 60 by adjustable connection 64. Adjustable connection 64 includes first bracket 68 connected to frame member 60 and second bracket 70 connected to cover 54 in incline midsection 28 of escalator 10 (see FIG. 1).

Figure 3A:
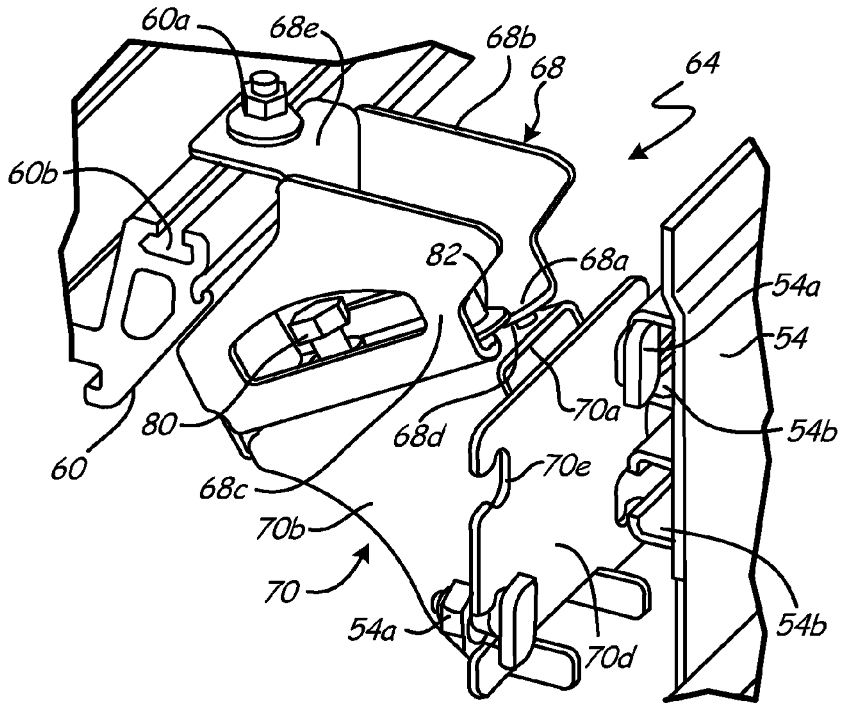
FIGS. 3A-3C show details of the adjustable connection of FIG. 2.
Figure 3B:
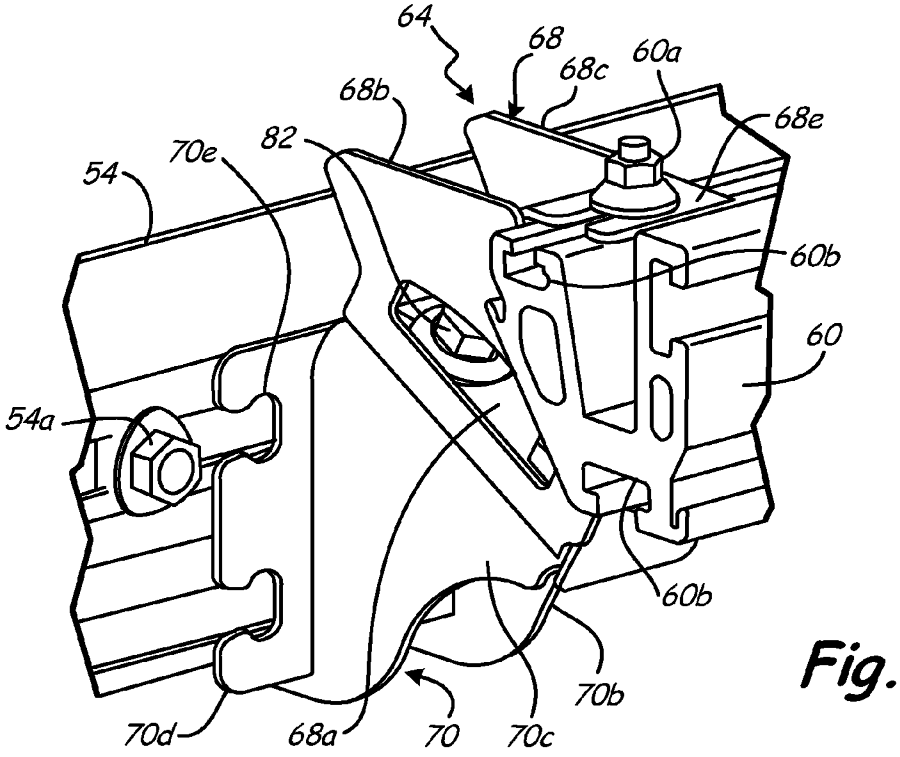
Figure 3C:
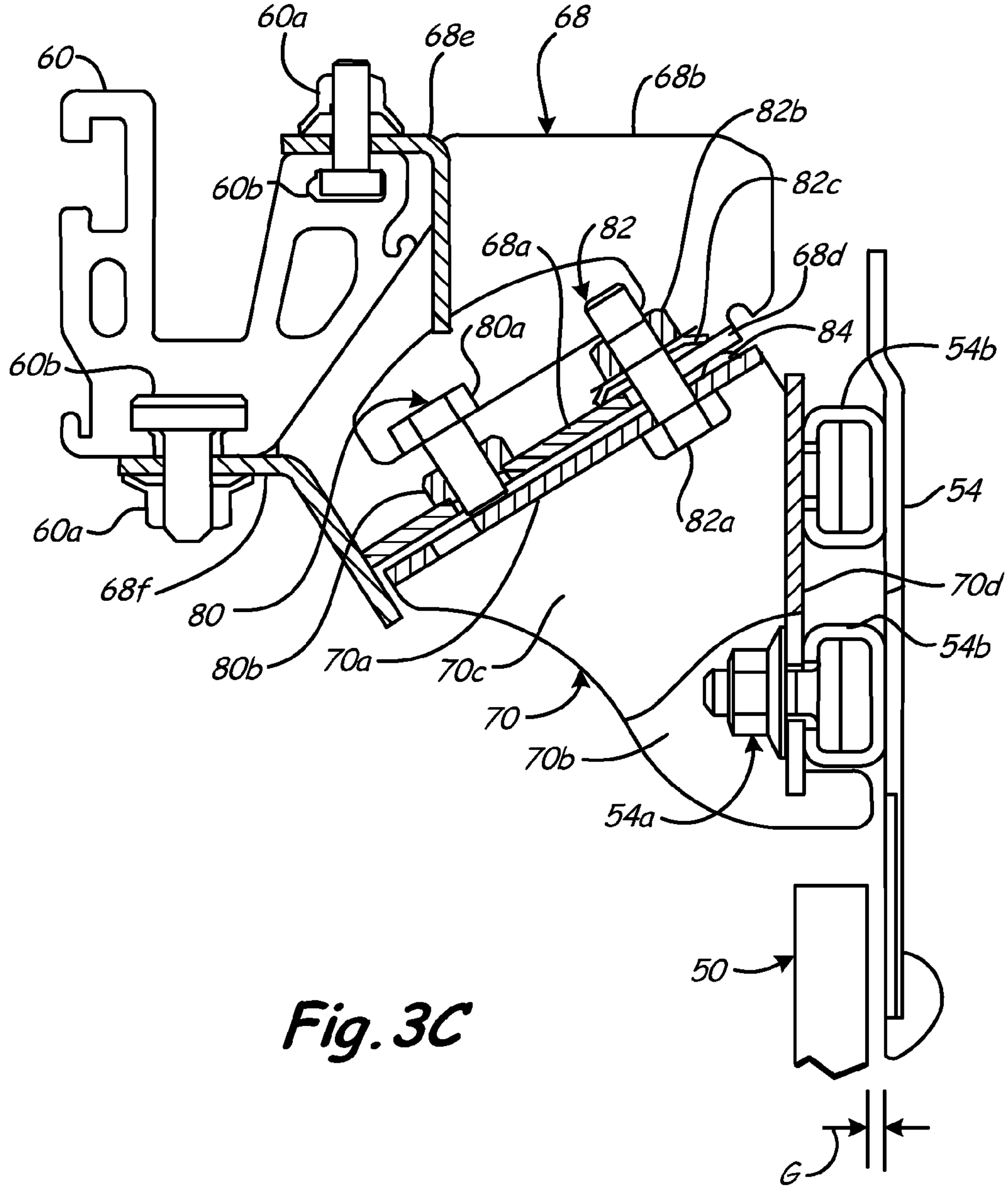

FIGS. 3A-3C show details of adjustable connection 64 between frame member 60 and step flange cover 54. FIGS. 3A and 3B are perspective views of adjustable connection 64. FIG. 3C is an orthogonal section view of adjustable connection 64. In FIGS. 3A-3C, adjustable connection 64 includes first bracket 68, second bracket 70, first fastener 80, second fastener 82, and pivot bosses 84 (shown in FIG. 3C). First bracket 68 is a generally U-shaped bracket including first plate 68*a*, second plate 68*b* projecting approximately perpendicular from first plate 68*a*, third plate 68*c* projecting approximately perpendicular from first plate 68*a* and approximately parallel to second plate 68*b*, and cutout 68*d* in first plate 68*a* to define a void between second and third plates 68*b*, 68*c*. Second bracket 70 includes first plate 70*a*, second plate 70*b* projecting approximately perpendicular from first plate 70*a*, third plate 70*c* projecting approximately perpendicular from first plate 70*a* and approximately parallel to second plate 70*b*, and fourth plate 70*d* arranged in generally perpendicular relationship and connected to second and third plates 70*b*, 70*c*. As shown in FIG. 3C, first fastener 80 includes bolt 80*a* and nut 80*b*. Second fastener 82 includes bolt 82*a*, nut 82*b*, and resilient member 82*c*. Resilient member 82*c* may be, for example, a conical spring washer or a helical coil spring.

In FIG. 3A-3C, first bracket 68 is connected to frame member 60 and second bracket 70 is connected to step flange cover 54. First bracket 68 and second bracket 70 of adjustable connection 64 are removably attached to frame member 60 and cover 54 respectively. First bracket 68 includes fourth and fifth plates 68*e*, 68*f* that are configured to receive fasteners 60*a* that engage channels 60*b* in frame member 60. Fourth plate 70*d* of second bracket 70 includes cutouts 70*e* in two parallel peripheral edges that are configured to engage fasteners 54*a* in channels 54*b* of step flange cover 54. The generally accessible position of fasteners 60*a* and 54*a* provided by adjustable connection 64 may generally reduce assembly and maintenance time and costs for escalators including connection 64 and alternative embodiments thereof.

In FIG. 3C, first plate 68*a* of first bracket 68 is arranged in generally parallel relationship and connected to first plate 70*a* of second bracket 70, thereby positioning step flange cover 54 a small gap distance G from step flange 50 of step 18 (not shown). First bracket 68 is connected to second bracket 70 by second fastener 82. Specifically, bolt 82*a* is fixedly attached to first plate 70*a* of second bracket 70 to arrange bolt 82*a* in cutout 68*d* in first bracket 68. Nut 82*b* engages bolt 82*a* and compresses resilient member 82*c* between bolt 82*a* and first plate 68*a* of first bracket 68, thereby connecting first bracket 68 to second bracket 70. First fastener 80 and pivot bosses 84 define the distance between first plate 68*a* of first bracket 68 and first plate 70*a* of second bracket 70. Bolt 80*a* of first fastener 80 engages nut 80*b* and passes through a hole in first plate 68*a* of first bracket 68. Nut 80*b* is fixedly attached to first plate 68*a*. Bolt 80*a* is thereby adjustable through nut 80*b* to push first plate 70*a* of second bracket 70 away from first plate 68*a* of first bracket 68. As bolt 80*a* of first fastener 80 pushes first plate 70*a* of second bracket 70, and as bolt 82*a* is pulled by first plate 70*a* and nut 82*b* is pulled by bolt 82*a* to compress resilient member 82*c*, compression of resilient member 82*c* of second fastener 82 allows first plate 70*a* of second bracket 70 to rotate about pivot bosses 84. Rotating first plate 70*a* of second bracket 70 by adjusting first fastener 80 also causes step flange cover 54 to rotate. Rotating step flange cover 54 provides for fine adjustments to the vertical and horizontal position of step flange cover 54 with respect to step flange 50 of step 18 (not shown). Although FIG. 3C shows pivot bosses 84 formed in first plate 70*a* of second bracket 70, alternative embodiments of adjustable connection 64 include pivot bosses 84 formed in first plate 68*a* of first bracket 68.

Figure 4:
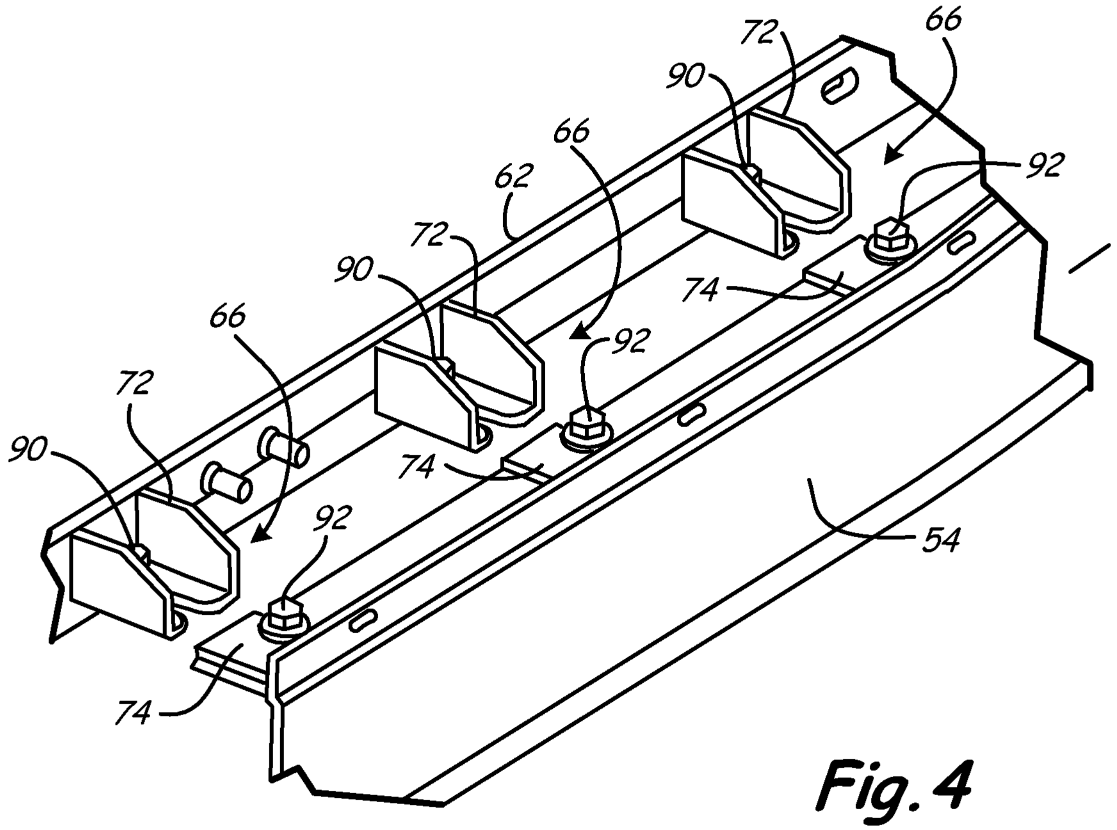
FIG. 4 is a partial perspective view showing an alternative adjustable connection according to the present invention between the frame and step flange cover of the escalator of FIG. 1.

FIG. 4 shows adjustable connection 66 according to the present invention between step flange cover 54 and frame member 62 of frame 12. For simplicity, the steps and other components of escalator 10 are not shown in FIG. 4. FIG. 4 is a partial perspective view of step flange cover 54, frame member 62, and adjustable connection 66 between cover 54 and frame member 62 in horizontal end section 26 of the truss sections. Because the structural members of frame 12 of escalator 10, i.e. members 60, 62, are different in incline midsection 28 than in horizontal end sections 26, escalator 10 includes two different adjustable connections 64, 66 for each section 28, 26 respectively. In FIG. 4, adjustable connection 66 includes first bracket 72 connected to frame member 62 and second bracket 74 connected to cover 54 in horizontal end section 26 of escalator 10. Connection 66 may be arranged in both end sections 26 of escalator 10 at top elevation 32 and bottom elevation 34 (shown in FIG. 1). Although the adjustable connection 66 is shown in a disconnected exploded state in FIG. 4, first bracket 72 connects to second bracket 74 to form adjustable connection 66 between frame member 62 and step flange cover 54.

Figure 5A:
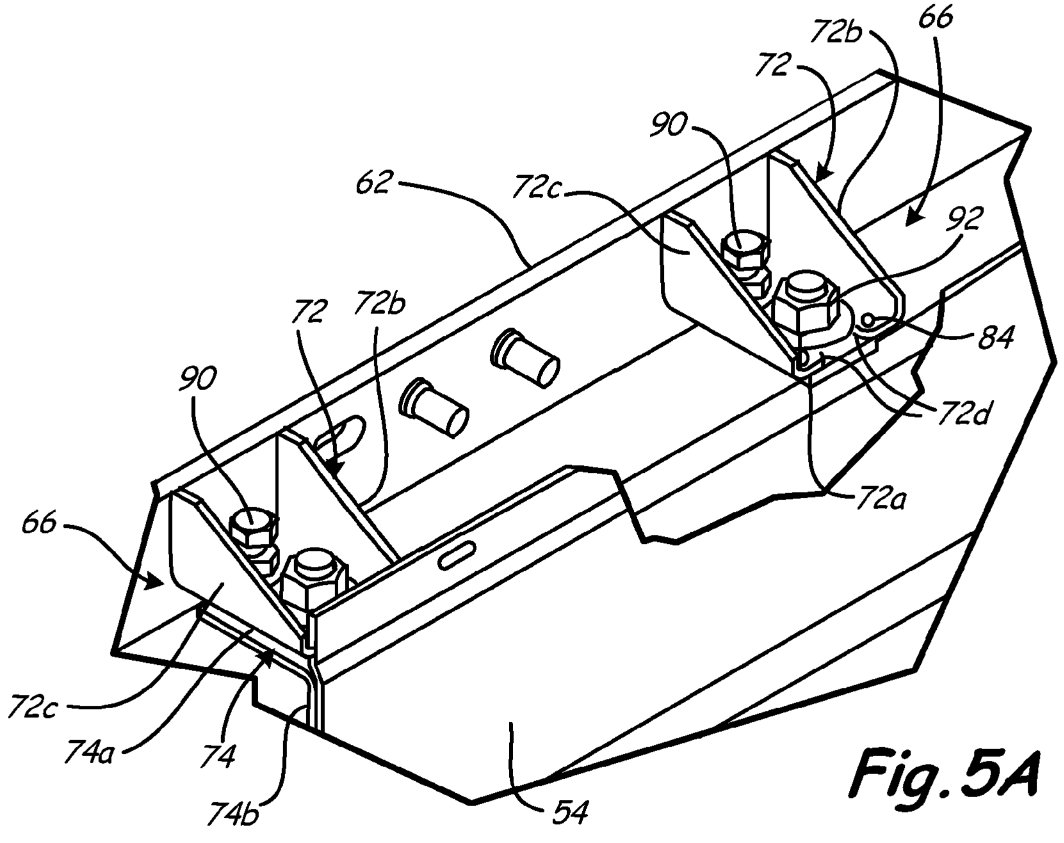
FIGS. 5A and 5B show details of the adjustable connection of FIG. 4.
Figure 5B:
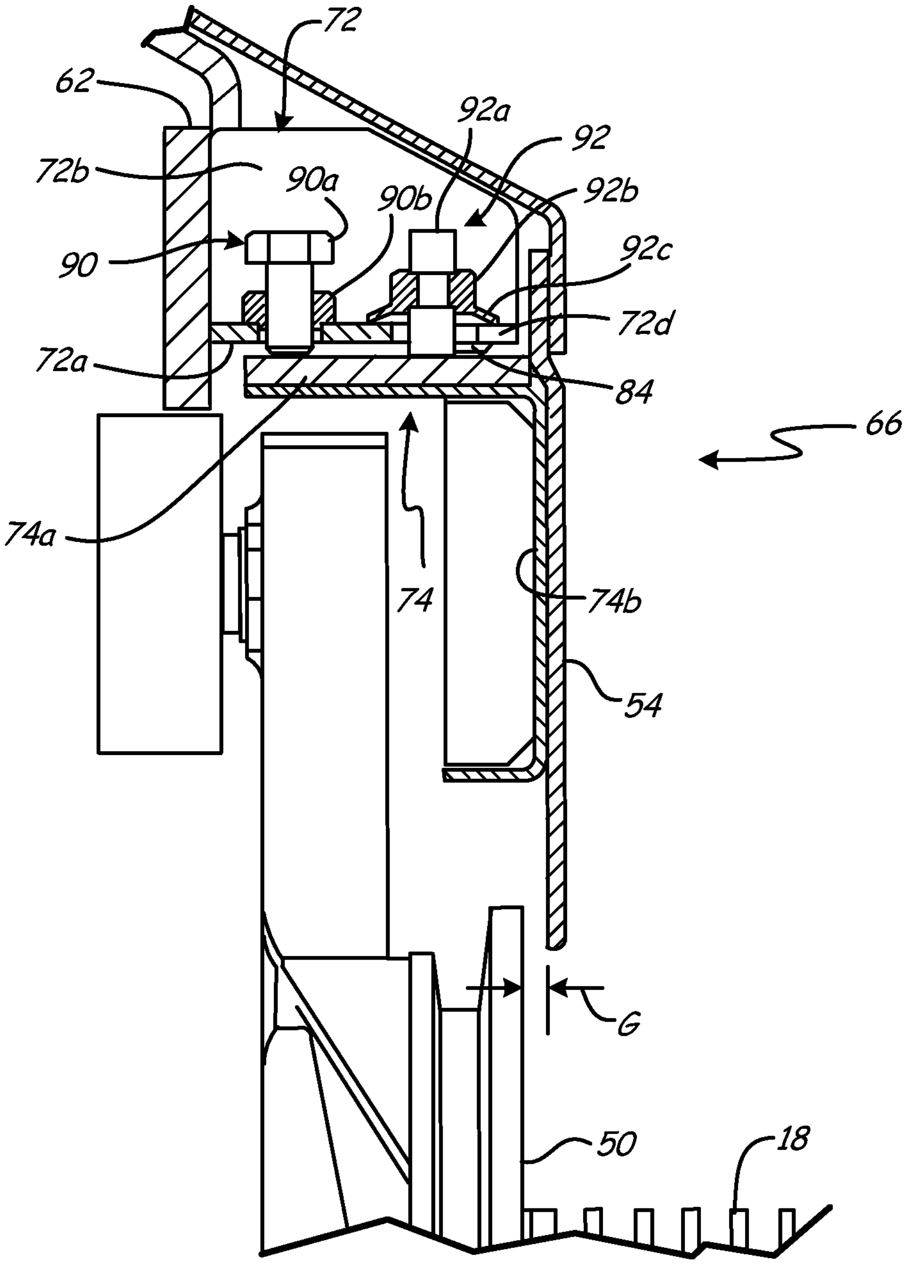

FIGS. 5A and 5B show details of adjustable connection 66 between frame member 62 and step flange cover 54, shown in FIG. 4. FIG. 5A is a partial perspective view of adjustable connection 66. FIG. 5B is an orthogonal section view of adjustable connection 66. In FIGS. 5A and 5B, adjustable connection 66 includes first bracket 72, second bracket 74, first fastener 90, second fastener 92, and pivot bosses 84. First bracket 72 is a generally U-shaped bracket including first plate 72*a*, second plate 72*b* projecting approximately perpendicular from first plate 72*a*, third plate 72*c* projecting approximately perpendicular from first plate 72*a* and approximately parallel to second plate 72*b*, and cutout 72*d* in first plate 72*a* to define a void between second and third plates 72*b*, 72*c*. Second bracket 74 includes first plate 74*a* and second plate 74*b* projecting approximately perpendicular from first plate 74*a* and oriented approximately perpendicular to second and third plates 72*b*, 72*c* of first bracket 72.

As shown in FIG. 5B, first fastener 90 includes bolt 90*a* and nut 90*b*. Second fastener 92 includes shank 92*a*, nut 92*b*, and resilient member 92*c*. Resilient member 92*c* may be, for example, a conical spring washer or a helical coil spring. In FIG. 5B, first bracket 72 is connected to frame member 62 and second bracket 74 is connected to step flange cover 54. First bracket 72 and second bracket 74 may be fixedly attached to frame member 62 and cover 54, respectively, by, for example, welding or other appropriate methods. First plate 72*a* of first bracket 72 is arranged in generally parallel relationship and connected to first plate 74*a* of second bracket 74, thereby positioning step flange cover 54 a small gap distance G from step flange 50 of step 18. First bracket 72 is connected to second bracket 74 by second fastener 92. Specifically, shank 92*a* is fixedly attached to first plate 74*a* of second bracket 74 to arrange shank 92*a* in cutout 72*d* in first bracket 72. Nut 92*b* engages shank 92*a* and compresses resilient member 92*c* between shank 92*a* and first plate 72*a* of first bracket 72, thereby connecting first bracket 72 to second bracket 74. First fastener 90 and pivot bosses 84 define the distance between first plate 72*a* of first bracket 72 and first plate 74*a* of second bracket 74. Bolt 90*a* of first fastener 90 engages nut 90*b* and passes through a hole in first plate 72*a* of first bracket 72. Nut 90*b* is fixedly attached to first plate 72*a*. Bolt 90*a* is thereby adjustable through nut 90*b* to push first plate 74*a* of second bracket 74 away from first plate 72*a* of first bracket 72. As bolt 90*a* of first fastener 90 pushes first plate 74*a* of second bracket 74, and as shank 92*a* is pulled by first plate 74*a* and nut 92*b* is pulled by shank 92*a* to compress resilient member 92*c*, resilient member 92*c* of second fastener 92 compresses to allow first plate 74*a* of second bracket 74 to rotate about pivot bosses 84. Rotating first plate 74*a* of second bracket 74 by adjusting first fastener 90 also causes step flange cover 54 to rotate. Rotating step flange cover 54 provides for fine adjustments to the vertical and horizontal position of step flange cover 54 with respect to step flange 50 of step 18. Although FIGS. 5A and 5B show pivot bosses 84 formed in first plate 72*a* of first bracket 72, alternative embodiments of adjustable connection 64 include pivot bosses 84 formed in first plate 74*a* of second bracket 74.

Embodiments of the present invention provide a connection between step flange covers and passenger conveyor frames that is adjustable to vary the position of a step flange cover relative to a moving skirt in at least two directions. The adjustable connection permits the step flange cover to be precisely positioned with respect to the moving skirt without the necessity of using crude adjustment techniques, such as, for example, using shims. Adjustable connections between step flange covers and conveyor frames according to the present invention act to reduce the cost, complexity, and time of installing and maintaining the step flange cover.

Although the present invention has been described with reference to particular embodiments, workers skilled in the art will recognize that changes may be made in form and detail without departing from the scope of the invention as defined in the claims that follow.

The invention claimed is:

1. A passenger conveyor comprising:
- a frame;
- a step chain moveably connected to the frame;
- a conveyor drive connected to the frame and configured to drive the step chain;
- a plurality of tread plates connected to the step chain;
- a step flange cover arranged adjacent to the tread plates;
- a first bracket connected to the frame;
- a second bracket connected to the step flange cover;
- one or more bosses on one of the first bracket and the second bracket; and
- a connector between the first bracket and the second bracket configured to pivot the second bracket with respect to the first bracket about the bosses to vary a position of the step flange cover in at least two directions.

2. The passenger conveyor of claim 1, wherein the connector between the first bracket and the second bracket comprises at least one fastener, and the connector varies the position of the step flange cover in the at least two directions by adjusting a single fastener.

3. The passenger conveyor of claim 1,
- wherein the first bracket comprises a first plate arranged in generally parallel relationship and connected to a first plate of the second bracket by the connector; and
- wherein the bosses are interposed between and arranged on one of the first plate of the first bracket and the first plate of the second bracket.

4. The passenger conveyor of claim 1, wherein the first bracket comprises:
- a first plate;
- a second plate projecting approximately perpendicularly from the first plate; and
- a third plate projecting approximately perpendicularly from the first plate and approximately parallel to the second plate;
- wherein a first plate of the second bracket is arranged in generally parallel relationship with, and is connected to, the first plate of the first bracket by the connector.

5. The passenger conveyor of claim 4,
- wherein the first bracket comprises a cutout in the first plate to define a void between the second and the third plates; and
- wherein the connector comprises a first fastener generally centrally aligned with the cutout and engaging a hole in the first plate of the first bracket offset from the cutout.

6. The passenger conveyor of claim 5, wherein the bosses are arranged adjacent the cutout on one of the first plate of the first bracket and the first plate of the second bracket.

7. The passenger conveyor of claim 6, wherein the connector further comprises a second fastener arranged in the cutout and connected to the second bracket to cause one of the first plate of the first bracket and the first plate of the second bracket to abut the bosses on the other of the first plate of the first bracket and the first plate of the second bracket.

8. The passenger conveyor of claim 7, wherein the second fastener comprises a resilient member arranged between the second fastener and the first plate of the first bracket.

9. The passenger conveyor of claim 8, wherein the first fastener is configured to push on the first plate of the second bracket to rotate the first plate of the second bracket about the bosses; and wherein the resilient member is configured to be compressed by the second fastener as the first plate of the second bracket rotates.

10. The passenger conveyor of claim 4, wherein the second bracket comprises:

the first plate arranged in generally parallel relationship with and connected to the first plate of the first bracket by the connector;

a second plate projecting approximately perpendicularly from the first plate;

a third plate projecting approximately perpendicularly from the first plate and approximately parallel to the second plate; and a fourth plate arranged in generally perpendicular relationship with and connected to the second and the third plates;

wherein the fourth plate is arranged in generally parallel relationship with, and is connected to, the step flange cover.

11. The passenger conveyor of claim 10, wherein the fourth plate comprises one or more cutouts in one or more peripheral edges of the fourth plate that receive one or more fasteners connected to the step flange cover.

12. The passenger conveyor of claim 11, wherein the cutouts comprise two cutouts in a first peripheral edge and two cutouts in a second peripheral edge approximately parallel to the first edge.

13. The passenger conveyor of claim 4, wherein the second bracket comprises:

the first plate arranged in generally parallel relationship with and connected to the first plate of the first bracket by the connector; and a second plate projecting approximately perpendicularly from the first plate and oriented approximately perpendicularly to the second and the third plates of the first bracket;

wherein the second plate is arranged in generally parallel relationship with, and is connected to, the step flange cover.

14. The passenger conveyor of claim 1 further comprising a moving skirt connected to at least one side of the tread plates, wherein the step flange cover at least partially covers the moving skirt.

15. A device for connecting a step flange cover to a frame of a passenger conveyor, the device comprising:

a first bracket connected to the frame;

a second bracket connected to the step flange cover;

one or more bosses on one of the first bracket and the second bracket; and a connector between the first bracket and the second bracket configured to pivot the second bracket with respect to the first bracket about the bosses to vary a position of the step flange cover in at least two directions.

16. The device of claim 15, wherein the connector between the first bracket and the second bracket comprises at least one fastener and the connector varies the position of the step flange cover in the at least two directions by adjusting a single fastener.

17. The device of claim 15, wherein the first bracket comprises a first plate arranged in generally parallel relationship and connected to a first plate of the second bracket by the connector; and wherein the bosses are arranged on and interposed between one of the first plate of the first bracket and the first plate of the second bracket.

18. The device of claim 15, wherein the first bracket comprises:

a first plate;

a second plate projecting approximately perpendicularly from the first plate; and a third plate projecting approximately perpendicularly from the first plate and approximately parallel to the second plate;

wherein a first plate of the second bracket is arranged in generally parallel relationship with and is connected to the first plate of the first bracket by the connector.

19. The device of claim 18, wherein the first bracket comprises a cutout in the first plate to define a void between the second and the third plates; and wherein the connector comprises a first fastener generally centrally aligned with the cutout and engaging a hole in the first plate of the first bracket offset from the cutout.

20. The device of claim 19, wherein the bosses are arranged adjacent the cutout on one of the first plate of the first bracket and the first plate of the second bracket.

21. The device of claim 20, wherein the connector further comprises a second fastener arranged in the cutout and connected to the second bracket to cause one of the first plate of the first bracket and the first plate of the second bracket to abut the bosses on the other of the first plate of the first bracket and the first plate of the second bracket.

22. The device of claim 21, wherein the second fastener comprises a resilient member arranged between the second fastener and the first plate of the first bracket.

23. The device of claim 22, wherein the first fastener is configured to push on the first plate of the second bracket to rotate the first plate of the second bracket about the bosses; and wherein the resilient member is configured to be compressed by the second fastener as the first plate of the second bracket rotates.

24. The device of claim 18, wherein the second bracket comprises:

the first plate arranged in generally parallel relationship with and connected to the first plate of the first bracket by the connector;

a second plate projecting approximately perpendicularly from the first plate;

a third plate projecting approximately perpendicularly from the first plate and approximately parallel to the second plate; and a fourth plate arranged in generally perpendicular relationship with and connected to the second and the third plates;

wherein the fourth plate is arranged in generally parallel relationship with and is connected to the step flange cover.

25. The device of claim 24, wherein the fourth plate comprises one or more cutouts in one or more peripheral edges of the fourth plate that receive one or more fasteners connected to the step flange cover.

26. The device of claim 25, wherein the cutouts comprise two cutouts in a first peripheral edge and two cutouts in a second peripheral edge approximately parallel to the first edge.

27. The device of claim 18, wherein the second bracket comprises:

the first plate arranged in generally parallel relationship with and connected to the first plate of the first bracket by the connector; and a second plate projecting approximately perpendicularly from the first plate and oriented approximately perpendicularly to the second and the third plates of the first bracket;

wherein the second plate is arranged in generally parallel relationship and connected to the step flange cover.

28. A method of adjustably connecting a step flange cover to a frame of a passenger conveyor, the method comprising:

attaching a first bracket to the frame;

attaching a second bracket to the step flange cover; and connecting the first bracket to the second bracket such that the second bracket is pivotable with respect to the first bracket about one or more bosses on one of the first bracket and the second bracket.

* * * * *